Dec. 8, 1931.  R. F. DOW  1,835,111
MACHINE FOR AND METHOD OF ASSEMBLING CHAINS
Filed May 27, 1925  9 Sheets-Sheet 5
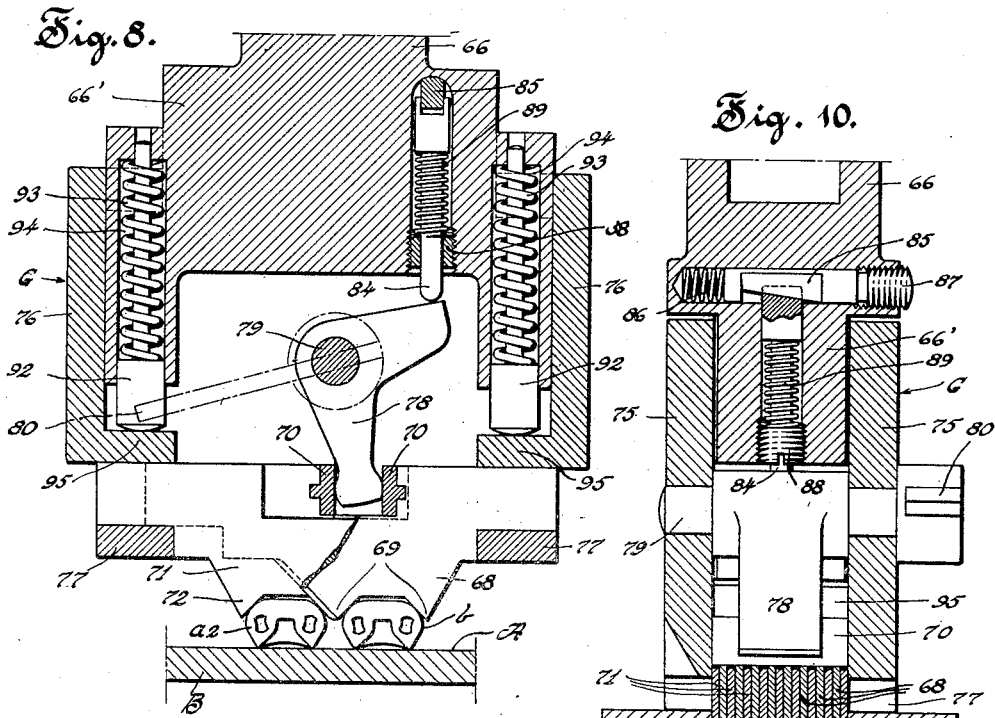
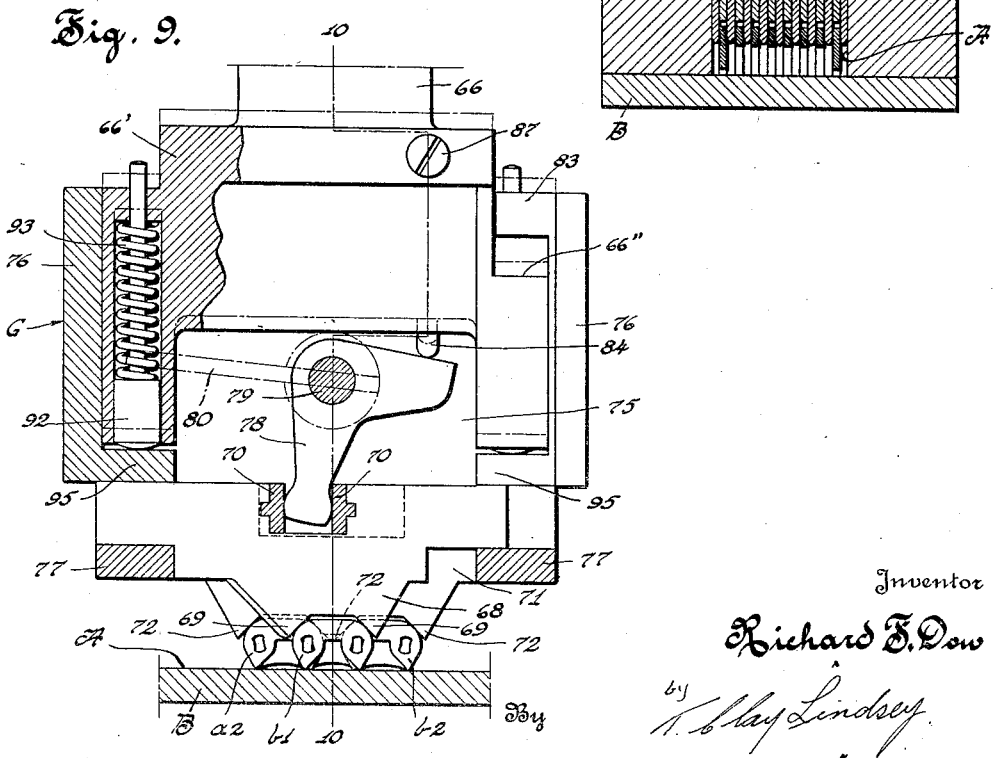
Inventor
Richard F. Dow
by T. Clay Lindsey
His Attorney

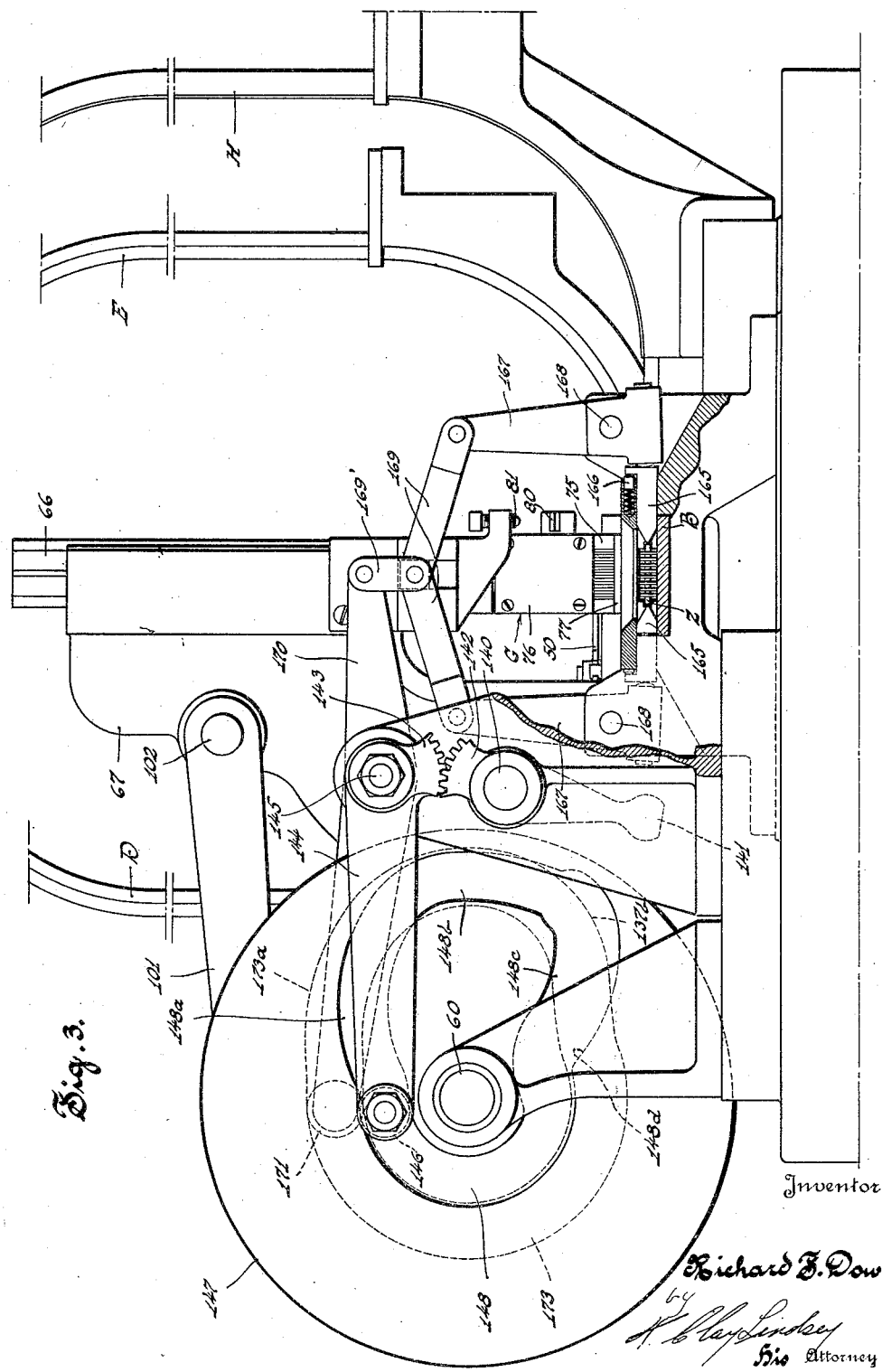

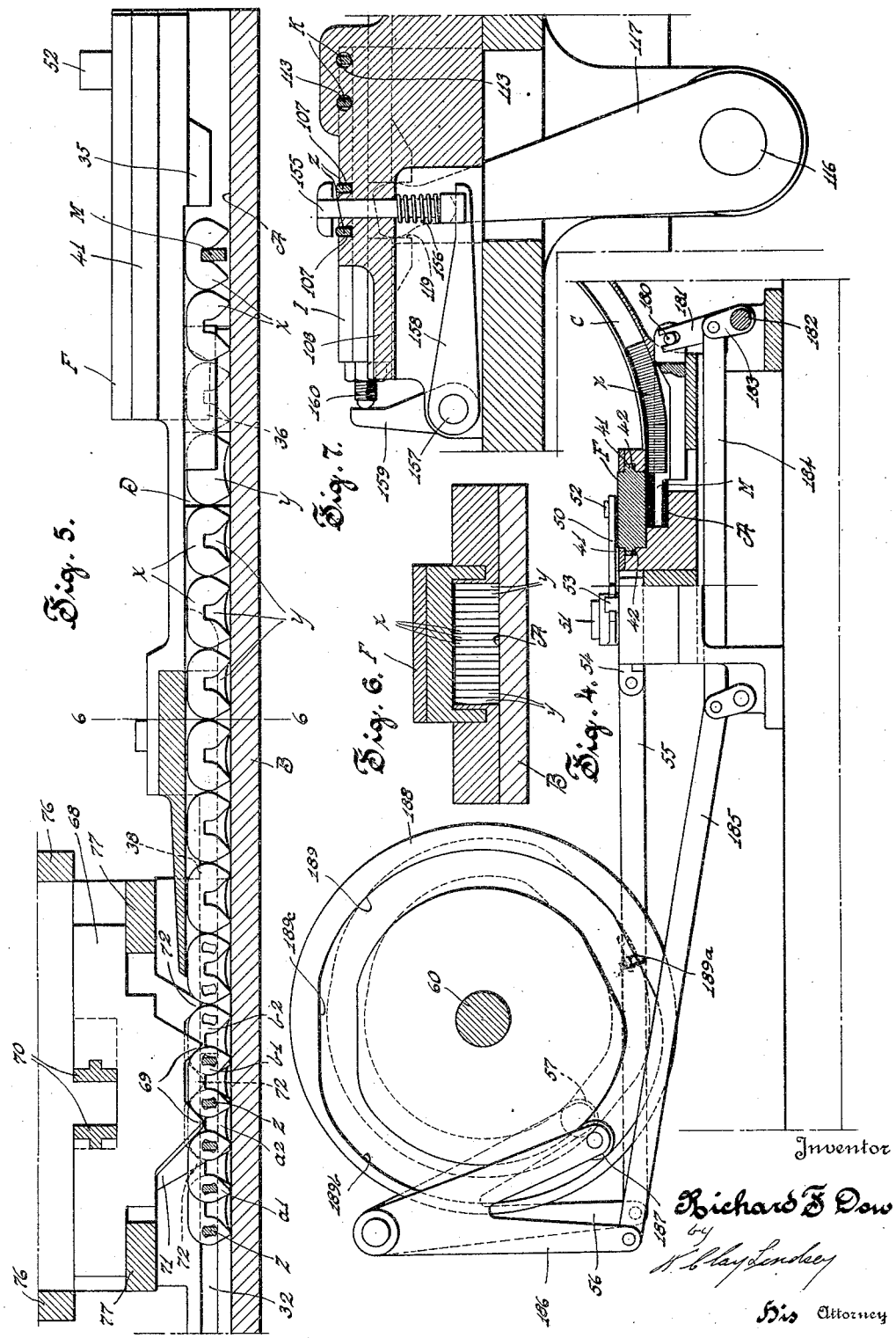

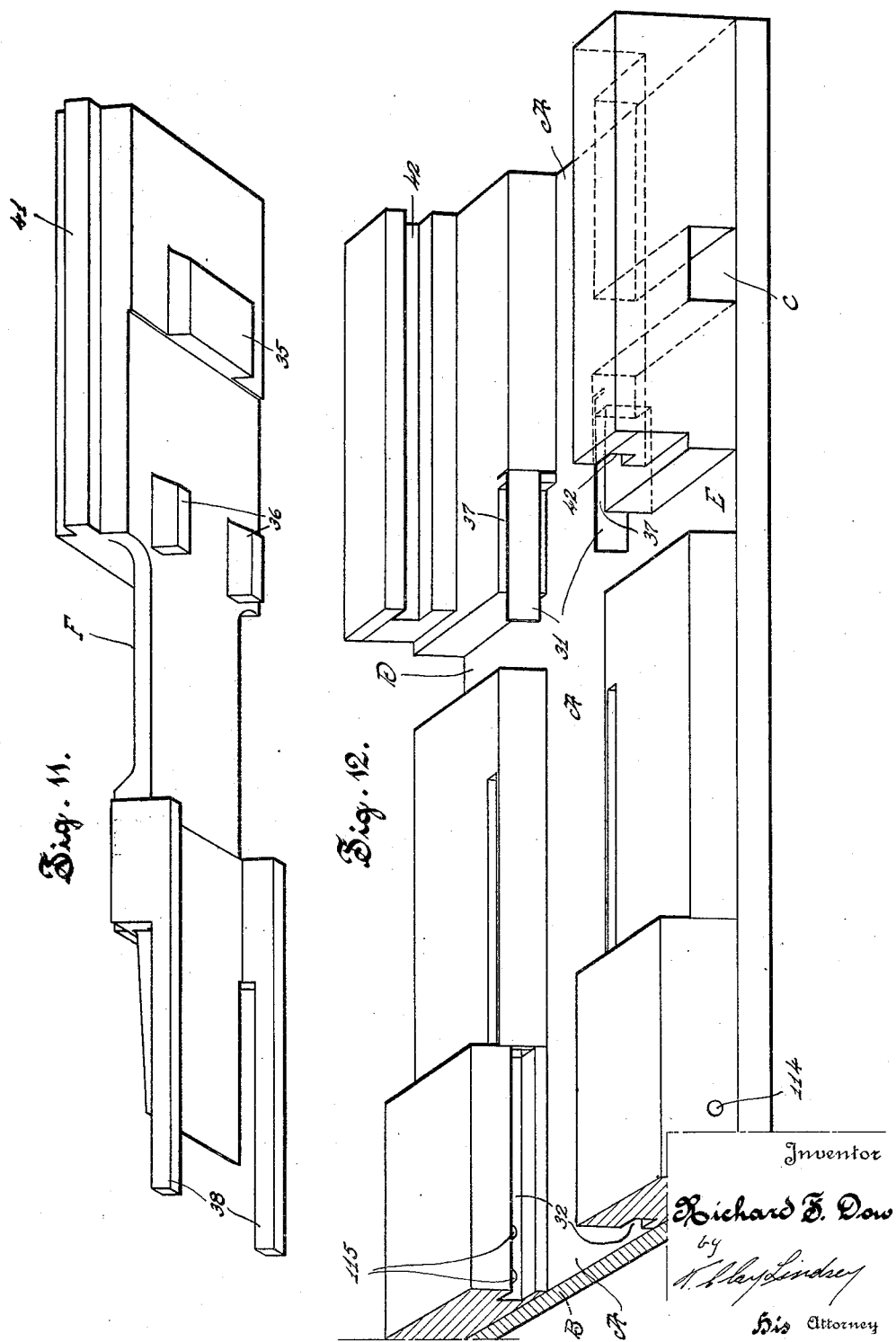

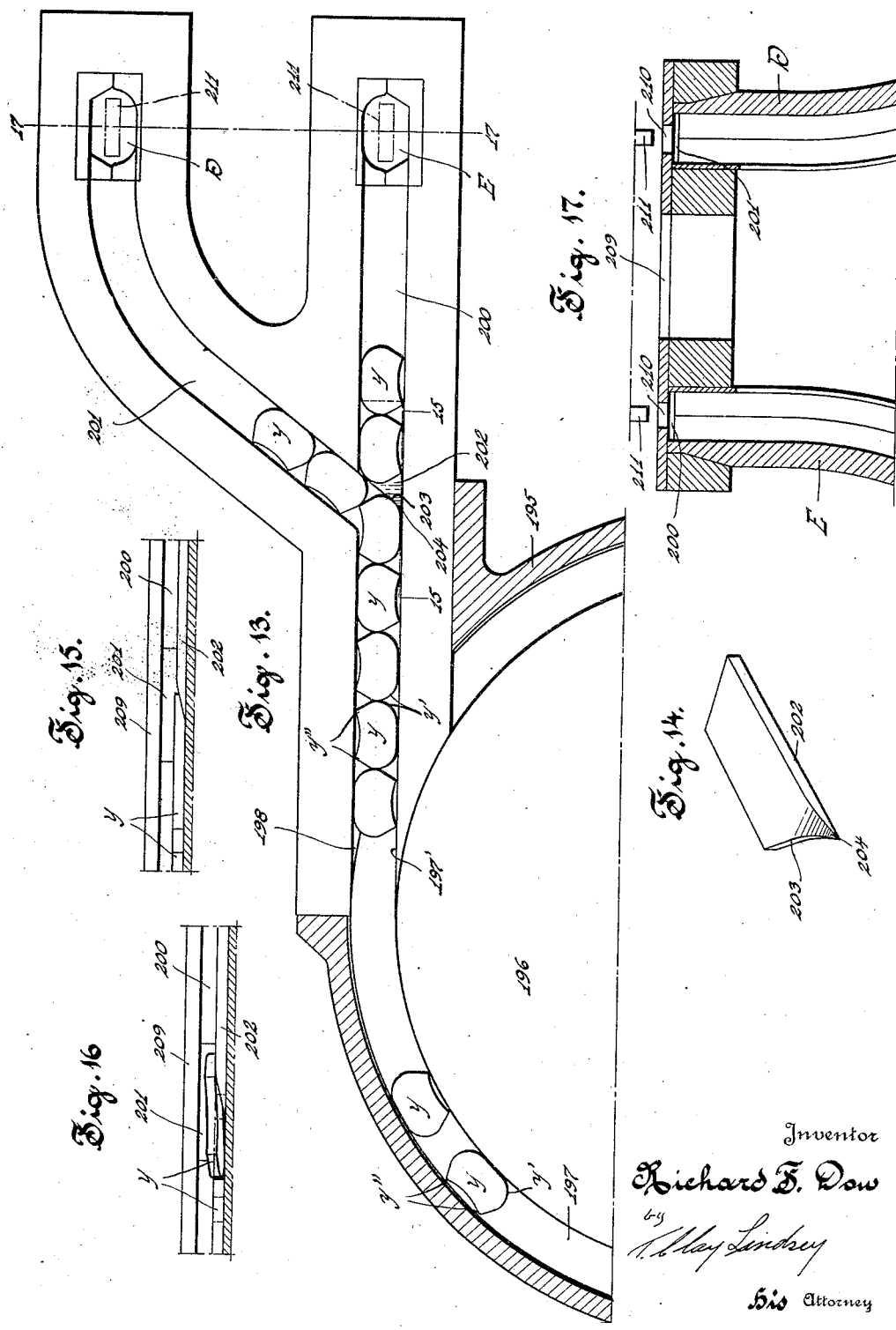

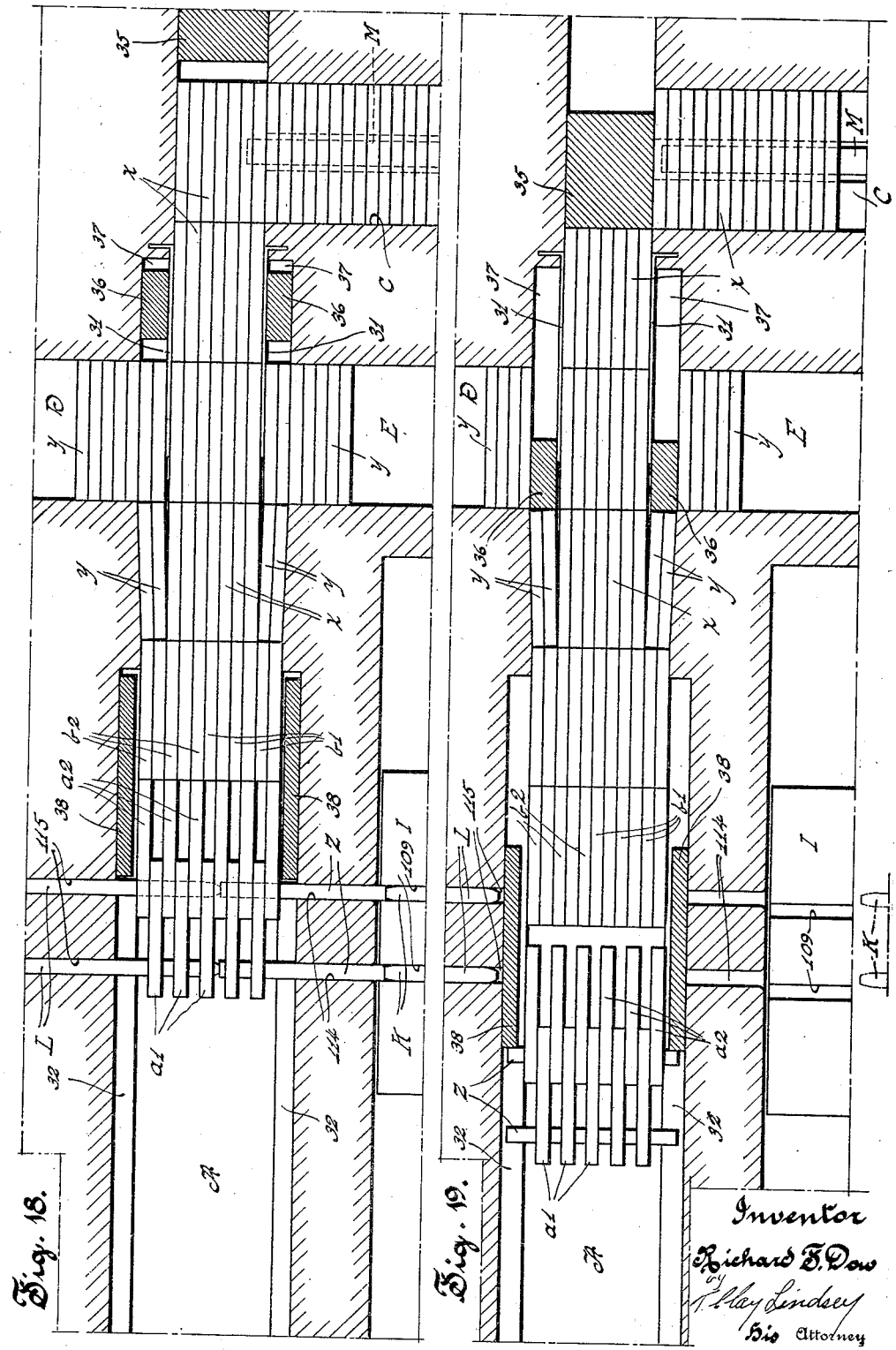

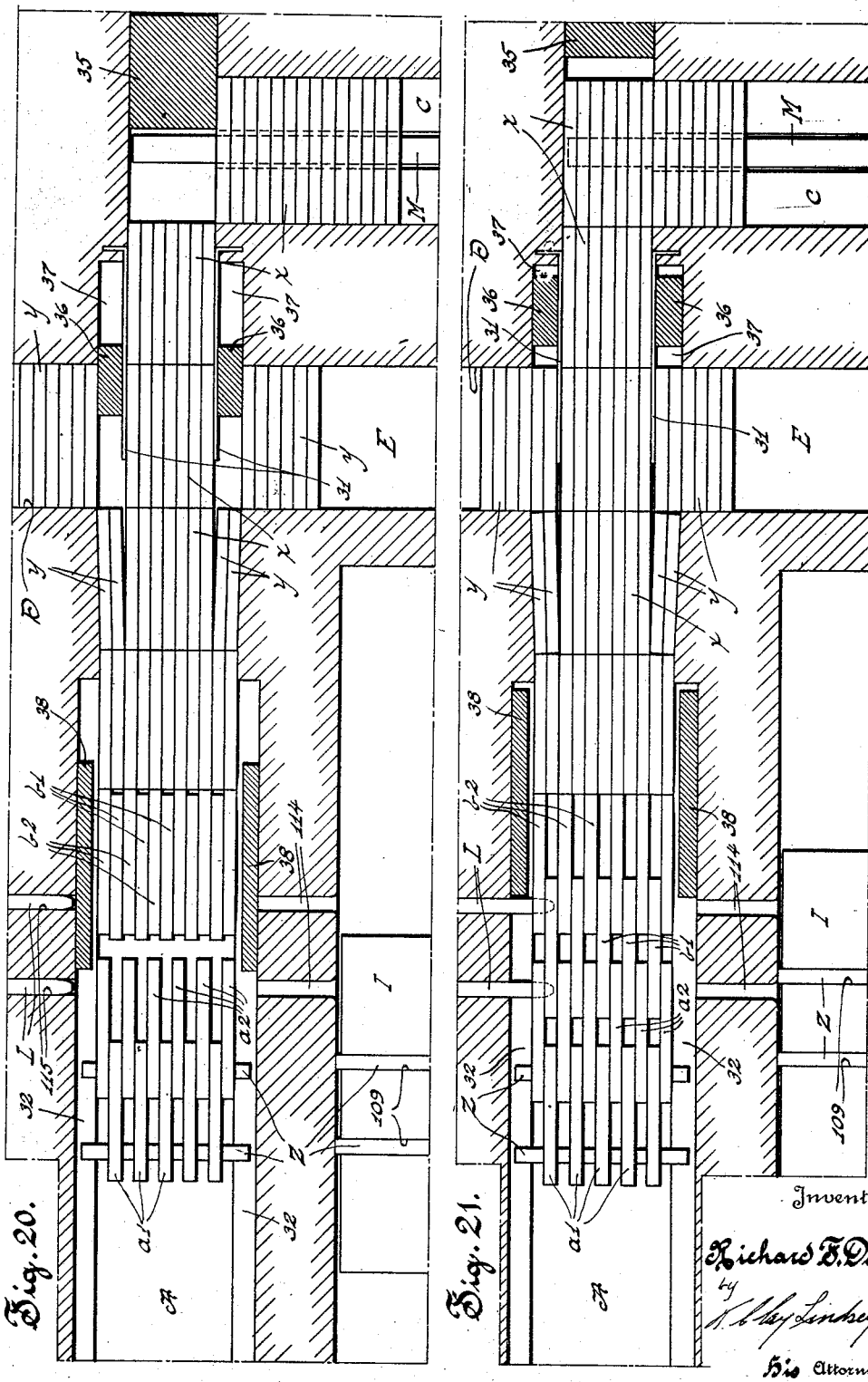

Patented Dec. 8, 1931

1,835,111

UNITED STATES PATENT OFFICE

RICHARD F. DOW, OF HARTFORD, CONNECTICUT, ASSIGNOR TO THE WHITNEY MANUFACTURING COMPANY, OF HARTFORD, CONNECTICUT, A CORPORATION OF CONNECTICUT

MACHINE FOR AND METHOD OF ASSEMBLING CHAINS

Application filed May 27, 1925. Serial No. 33,288.

This invention relates to the art of assembling chain parts and has as its object to provide an improved machine for this purpose having various features of novelty and advantage and which is particularly characterized by its simplicity and effectiveness in construction, arrangement and operation and by its high rate of productivity.

Other objects will be in part obvious and in part pointed out more in detail hereinafter.

The invention accordingly consists in the features of construction, combination of elements and arrangement of parts which will be exemplified in the construction hereinafter set forth, and the scope of the application of which will be indicated in the appended claims.

It is to be understood that, while I have shown but one embodiment of my invention in the accompanying drawings, this showing is by way of exemplification only, the invention being susceptible of various modifications and changes in construction, arrangement and operation which would be within the spirit of the invention, and certain of the novel features and characteristics may be employed in other combinations than those herein described. Furthermore, the invention resides in the methods recited in the appended claims.

In the accompanying drawings, wherein is shown, by way of illustration, one of the many embodiments which the present invention may take:

Fig. 3 is view of the left hand or delivery end of the machine, certain of the parts being broken away for the purpose of illustrating more clearly the mechanism for the pinching or heading the ends of the connecting pins after the same have been assembled in the link elements.

Fig. 4 is a sectional view taken substantially on line 4—4 of Fig. 1, and shows in section the lower end of the chute through which the driving links are delivered to the guideway.

Fig. 5 is a view taken longitudinally through the guideway, the means for advancing the rows of links therein and a portion of the combing mechanism.

Fig. 6 is a transverse section through the guideway, this view being taken substantially on line 6—6 of Fig. 5.

Fig. 7 is a vertical sectional view taken substantially on line 7—7 of Fig. 2 and shows portions of the pin delivery mechanism.

Fig. 8 is a vertical longitudinal section through the combing mechanism, the parts being shown in the position which they take when the mechanism is lowered onto the link elements and before it combs the same.

Fig. 9 is a view similar to Fig. 8, showing the position which the parts take when the combing operation has just been completed.

Fig. 10 is a transverse sectional view through the combing mechanism, this view being taken substantially on line 10—10 of Figure 9.

Fig. 11 is a perspective view looking at the side and bottom of the slide for advancing the links in the guideway and for advancing the chain.

Fig. 12 is a perspective view of the guideway.

Fig. 13 is a view showing more or less diagrammatically and in top plan a portion of the hopper for the guide plates or links and the means for distributing the guide plates to the two chutes which deliver the same to opposite sides of the guideway.

Fig. 14 is a perspective view of a deflector or turning plate which determines the respective chute to which the guide plates are delivered.

Fig. 15 is a view showing diagrammatically the manner in which a guide plate will be deflected by the deflector when the plate is lying with its concave edge towards one side of the channel, this view being taken substantially on line 15—15 of Fig. 13.

Fig. 16 is a view similar to Fig. 15 but shows the manner in which a guide plate rides over the deflector when the guide plate has its concave edge towards the other side of the channel.

Fig. 17 is a view taken substantially on line 17—17 of Fig. 13 and shows, in cross section, the upper ends of the guide plate chutes.

Figure 1:
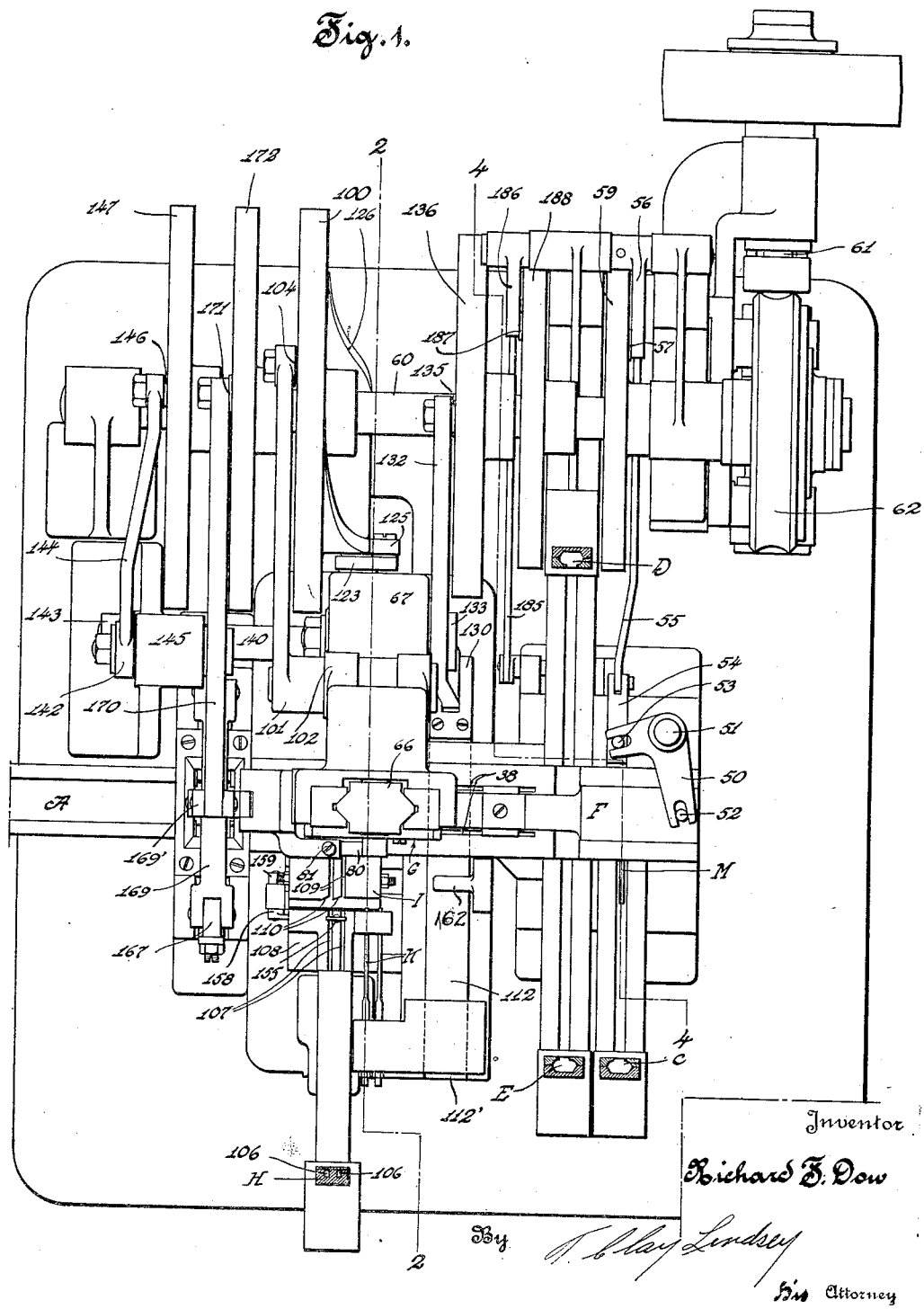
Figure 1 is a top plan view of the machine, the hoppers for the link elements and for the connecting members or pins being omitted.

Figs. 18 to 21 inclusive, are schematic views showing the successive steps which take place during the assembling operations, Fig. 18 illustrating a first row of links as having been combed and the pins as being inserted into the combed links.

Fig. 19 shows the assembled portion of the chain as having been advanced one step and the rows of links advanced to bring another row into combing position.

Fig. 20 shows the means for advancing the partially formed chain and means for advancing the rows of links as being on their return movement, and that row of links in combing position as just starting to be combed.

Fig. 21 shows the links as having been fully combed, and the pilots, for insuring that the combed links are in proper overlapping relation to the links at each end thereof, are illustrated as advancing.

In order that the detailed description which is to follow may be better understood, a general description of the mechanisms of the machine and the mode of operation thereof will here be given.

It may be well here to state that in the present illustrative disclosure, the machine is shown as employed for assembling the parts of silent chains; that is, chains wherein at least some of the links are provided with teeth at each end, adapted to cooperate with the teeth of sprockets or pinions over which the chains pass.

While the invention finds peculiar applicability to this use, it is to be understood that the present disclosure is by way of exemplification only. In the present instance, the machine is particularly constructed to assemble chains having driving links of the character just described and guide plates or links which may be devoid of teeth, the plates in the present instance being provided at each side of the chains. It is, of course, obvious that the machine may be employed to assemble links other than of the character here described and to assemble chains composed entirely of driving links or chains wherein the guide plates are arranged other than as herein stated. The driving links are designated by the letter X and the guide plates or links by the letter Y. Each of these link elements is provided adjacent each end with a hole for receiving a connecting member, the holes in the various links being spaced apart at like distances. The distance between the centers of the holes may be referred to as one pitch. The holes may be of any suitable shape and size. The connecting members are here shown as being in the form of pins Z, it being understood of course that the connecting members may be of any suitable construction, design or shape.

The machine is provided with a bed B, having a longitudinally extending channel or guideway A to which the links are delivered, the links being fed or advanced in this guideway in rows, the links of each row being in side by side, or transversely alined, relation and the rows being one behind the other. The links are supplied to the guideway through suitable chutes from hoppers. The arrangement of the chutes and hoppers will depend upon the character of the chain to be assembled. In the present instance, one chute C is employed for delivering driving links X to the central portion of the guideway, and two chutes, D and E, respectively, deliver guide plates to the opposite sides of the guideway. The rows of link elements are successively advanced in the guideway by pushers 35 and 36 to a combing position where combing mechanism, shown in detail in Figs. 8 to 10 inclusive, advances or displaces certain of the links with respect to the other ones the distance of one pitch so that the displaced links are brought into overlapped and intervening relation to these other links and to the links of the set last assembled on the chain. After the links are thus combed pilots L are advanced to insure proper alinement of the pin receiving holes and then the connectors or pins Z are inserted in the two sets of alined holes. These pins may be delivered from a pin hopper through a suitable chute H to a shuttle or transfer device I which automatically carries the pins into alined relation with the pin inserting means such as push rods K, and which rods are in alined relation with the pilots. After the pins are inserted, the portion of the chain assembled is advanced the distance of two pitches, as by means of pushers 38, another row of links is fed to combing position, these links are combed, and the sequence of movements is repeated until a chain of the desired length is obtained. If desired, the machine may be provided at a point beyond the combing position, with means for clinching, nicking or heading the ends of the inserted pins.

Referring now more specifically to the construction, the guideway in which the rows of links are fed to combing position and in which the chain is formed will first be described. This guideway, which is designated generally by the letter "A," is in the form of a channel provided in the upper surface of the bed or frame B, which may be of any suitable construction. The size, shape and other characteristics of the channel will depend upon the width of the chain, the relation in which the driving links and guide plates are to be assembled, and other conditions. In the present instance, wherein the machine is shown as being constructed for assembling chains, the driving links of which are in the center and one guide plate is provided at each end of each set of driving links, the driving links X are delivered in side by side relation through the chute C to the forward end of the channel, and two side links Y are delivered to each side of the channel through chutes, D and E, respectively, each time the rows of link elements are advanced.

For the purpose of maintaining link elements in upright position at the point where the side plates are delivered to the channel, there are provided thin diaphragms or baffles 31, spaced apart a distance corresponding to the length of the rows of driving links. Between the chutes D and E and the combing position the channel is substantially of the same width as the rows of elements comprising the driving links and the guide plates. Each side wall of the channel is provided with a groove 32 for the purpose of accommodating the means for intermittently advancing the chain and also to accommodate the protruding ends of the pins Z.

The means for feeding the rows of links to combing position and for advancing the chain being formed with a step by step movement will now be described.

The means for advancing the driving links, the means for advancing the guide plates, and the means for advancing the chain may be, if desired, separate from one another and operated by mechanisms driven in timed relation to each other. In the present instance, these various means are operated together. The means for advancing the driving links comprises a pusher 35 which may be in the form of a lug depending from a slide F. This lug normally lies rearwardly of the delivery end of the chute C as shown in Fig. 18 and when advanced is adapted to blank that chute, as shown most clearly in Fig. 19. The means for advancing the guide plate include a pair of pushers 36 depending from a slide F and normally positioned, as shown in Fig. 21, in grooves 37 formed in part by diaphragms 31. When the pushers 36 are advanced, they blank respective chutes D and E, as shown in Fig. 19. The means for feeding or advancing the chain, each time links are added thereto, is in the form of pushers 38, provided at the forward end of the slide F and slidably mounted in the grooves 32. The slide F preferably covers the links positioned in the channel up to the combing point and may have at each side a rib 41 engaging guide grooves 42.

It will be understood that each time the slide F is advanced, the link pushers advance the rows of links a distance equal to the length of a link and the chain pushers advance the partially formed chain a distance of two pitches, one pitch being the distance between the holes at the opposite ends of a link. There is, therefore, provided a lost motion between the link pushers and the respective links. Fig. 18 shows how the lost motion is brought about by the pushers 38 acting upon the pins Z from the beginning of their stroke, while action of the pushers 35 and 36 is delayed on account of the positions of the chutes. This arrangement is provided because the comber forms each successive row of links into two sets of links and these two sets are connected to the chain and the chain is then advanced so that the links of the last set connected to the chain will be in such a position that when the next row of links is combed, the set of combed links, which is advanced, will have the holes at their forward ends in alinement with the holes at the rear ends of the links last connected to the chain and the holes at the rear ends of the links of the advanced set will be in alinement with the holes at the forward ends of the links which have not been advanced.

The slide F may be moved in any suitable manner. In the present instance the following arrangement is provided for this purpose: A bell crank lever 50 (see Figs. 1 and 4) is pivoted to the frame as at 51 and has a forked end straddling a pin 52 arising from the slide. The other forked end of the lever straddles a pin 53 on a slide block 54, connected by a link 55 to one arm of a lever 56, the other end of which carries a roller 57 engaging in a cam groove in the side face of a cam 59, fixed on a cam shaft 60, suitably journalled on the frame. This cam shaft may be driven in any suitable manner, as for instance, from drive shaft 61, and through gearing 62.

It is understood that the driving links are fed by gravity through the chute C to the guideway A. In order to prevent the links, as they are delivered into this guideway or channel, from falling over or becoming otherwise displaced, means are provided for properly guiding the links into the channel. This means, in the present instance, is in the form of a guide M which the links are adapted to straddle, as shown most clearly in Figs. 4 and 5. This guide is positioned at the lower end of the chute C and is arranged to be advanced into a channel A when links are to be fed thereinto and to be withdrawn when the links are to be advanced in the channel. In the present instance, the guide is connected by a pin and slot arrangement 180 with an arm 181 fixed to a rock shaft 182 which also carries the second arm 183. The arm 183 is connected by links 184 and 185 to one end of a lever 186, the other end of this lever having a roller 187 working in a groove in the face of a cam 188. This cam groove has a dwell portion 189 for holding the guide M in a retracted position; a portion 189a for advancing the guide to the position shown in Figs. 4 and 20; a dwell portion 189b for holding the slide in that position, and a return portion 189c for withdrawing or retracting the guide to the position shown in Fig. 19.

The comber and the means for operating same will now be described, particular reference being had to Figs. 3, 8, 9 and 10. The comber includes a head G carried on the lower end of a carrier or ram 66, mounted for vertical movement in a standard or bracket 67, arising from the base or frame. Mounted in the head G, for movement longitudinally of the guideway A, is a movable comb, comprising spaced apart combing blades 68. The spaced relation of these blades will depend upon the character of the chain being formed, and particularly the overlapping relation in which the successive sets of links are to be connected. In the present instance, where it is assumed, for purposes of illustration, that in the assembled chain alternate link elements are in overlapping relation to the intervening ones, the blades 68 are spaced apart the distance of the width of a link element. Each of the movable blades is provided with two projections 69, so located and shaped that they engage the opposite ends of the respective links and center the links, so to speak. The movable combing blades, in the present instance, are connected together by cross bars or members 70.

The comber further comprises a series of stationary blades 71, positioned between the movable blades 68, and each having three projections 72. The projections 72 are so located that the central projections and the foremost ones engage, center and hold in position the links of the last set connected to the chain, and the central projections and the rearmost ones engage and hold in position those links of the row which is being combed but which are not to be advanced during the combing operation. The head G comprises a pair of side plates 75, end plates 76 and comb supporting plates 77. The numeral 78 designates a lever located within the head and fixed to a pivot 79 journalled in the side plates 75. On one end of the pivot is an arm 80, adapted when the comber is raised, to engage a fixed, but adjustable, abutment or screw 81 whereby the movable comb is longitudinally moved from the position shown on Fig. 9 to the normal position shown in Fig. 8. The arrangement is preferably such that the combs may be lowered into engagement with the respective sets of links, the movable comb may thereafter be actuated to comb the links, and then the pressure of the combs on the links may be somewhat relieved so that while the combs maintain the links in overlapping relation, the links may be moved slightly, if necessary, by the pilots when the latter are advanced to aline the holes of the links preliminary to inserting the pins Z. After the pins Z are inserted, the comber is raised and the movable comb is moved to the normal position shown in Fig. 8. The head G is mounted on the lower end of the ram 66 for limited vertical movement relative thereto. In the present instance, the lower end of the ram has an enlargement 66' on its lower end which fits between the side and end plates of the comber head. The end plates 76 of the comber head have ears 83 which project over shoulders 66'' on the enlargement 66'. See Figs. 8 and 9. The lower end of the enlargement 66' is hollowed or cored out so as to accommodate the lever 78. Carried by the enlargement is an adjustable abutment adapted to engage the lever 78 when the ram is lowered to thereby actuate the movable comb. This abutment in the present instance is in the form of a pin 84 which may be adjusted in any suitable manner as, for instance, by means of a longitudinal adjustable cam 85 behind which is a spring 86. The cam is adjusted by means of a screw 87. The pin 84 is held in place by a screw plug 88 and is normally urged towards the cam 85 by a spring 89. Between the ram and the head there is provided means for resiliently pressing the head downwardly against the links when the ram is lowered. In the present instance, these means take the form of plungers 92 behind which are springs 93, the plungers and springs being mounted in suitable vertical bores 94 in the enlargement. The plungers bear against the inturned or flanged lower edges 95 of the end plates 76.

The ram 66, together with the comber mounted thereon, may be raised and lowered in any suitable manner, as, for instance, by means of a cam 100 operating through a rocker lever 101 pivoted to the standard 67, as at 102. The forward circular end of the rocker lever engages in a transverse opening 103 in the ram. As most clearly shown in Fig. 2, the cam 100 has a cam groove provided with a portion 105 which is effective to lower the ram; a portion 105a, which slightly raises the ram to the dotted line position, as shown in Fig. 9, after the links are combed; a dwell portion 105b which holds the ram in that position, and in which position the combs hold the links in proper overlapping relation with such pressure that the pilots L may aline the holes of the links; a return portion 105c for raising the ram to its highest position; and a dwell portion 105d for holding the ram and comber in elevated position. While the dwell portion 105b is effective, the pilots come into play to properly aline the holes in the overlapping combed plates and the pins Z are inserted as the portion 105c is effective to raise the ram to the dwell portion 105d.

Figure 2:
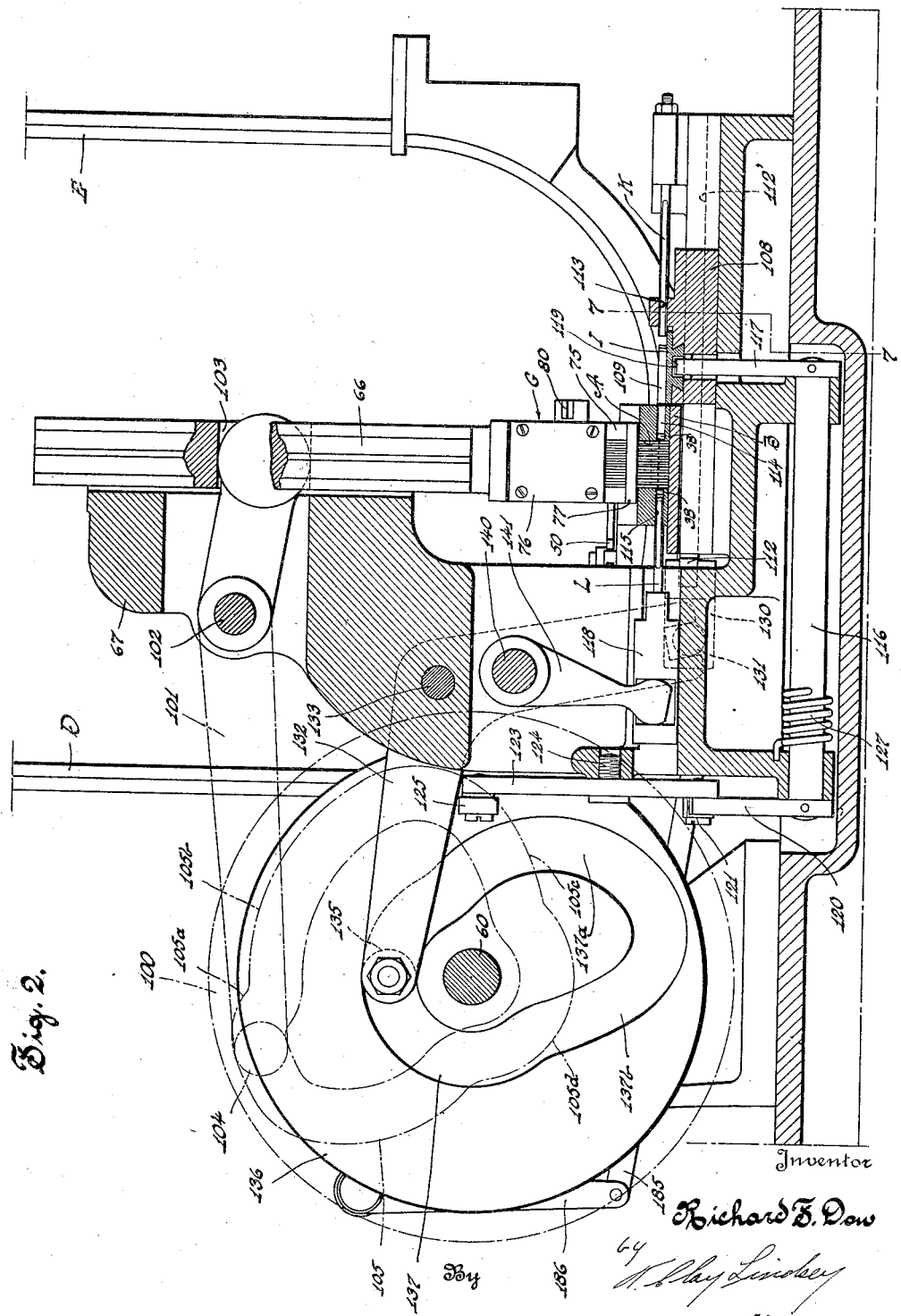
Fig. 2 is sectional view taken substantially on line 2—2 of Fig. 1.

The means for supplying and inserting the connecting members or pins Z will now be described, particular reference being had to Figs. 1, 2 and 7. The pins are supplied from a suitable hopper, not shown, through a chute H, to a shuttle I which properly positions the pins with respect to insertors which are in the form of push rods K. There are two passages 106 in the chute H, through which two rows of pins are fed by gravity in end to end relation. The lower ends of these passages register with grooves 107 in the upper face of a guide 108 fixed to the bed. The shuttle I has in its upper face, a pair of grooves 109 spaced apart in accordance with the grooves 107 and respectively registering therewith when the shuttle is in the pin receiving position shown in Figs. 1 and 20. The forward corners of the groove 109 are inclined, as at 110, so as to act in the nature of cams for forcing back the pins which may be protruding from the grooves 107 and into the path of movement of the shuttle.

The push rods K are carried at one side of the channel A by a slide 112, which extends transversely of and beneath the channel. This slide is guided in a suitable groove or way 112' on the bed. The push rods K slide through suitable openings 113 in the guide 108 and one side wall of the channel A. As shown most clearly in Figs. 2 and 18, the side wall has openings 114 which are adapted to respectively accommodate the push rods. The pilots L which are in alinement with the push rods K, are carried by a slide 118. The other wall of the channel is provided with opening 115 in which the pilots are guided.

The shuttle I, which is mounted on the guide 108 for movement at right angles to the line of movement of the slide 112, is reciprocated in the following manner particular reference being had to Figs. 1, 2 and 7: Supported in the foot of the standard 67 is a rocker shaft 116, having at one end an arm 117, engaging in a recess 119 in the bottom of the shuttle. On the other end of the shaft 116 is an upwardly extending arm 120, connected by a pin and slot arrangement 121 to one end of a lever 123, pivoted as at 124. The upper end of the lever 123 carries a roller 125 with which cooperates a cam 126. This cam is in the form of a flange extending from one face of the cam 100. The cam 126 is so arranged as to positively move the shuttle, through the connections described, from delivery into receiving position after the pusher rods have been advanced and then withdrawn to the fully retracted position shown in Fig. 1. The cam 126 is further so constructed that at the proper time a spring 127 may move the shuttle according to the cam path from receiving to delivery position.

The slide 112 which carries the push rods K, is reciprocated in timed relation to the pilots L and the shuttle in the following manner: Fixed to the left hand end of the slide 112, referring to Fig. 2, is an extension 130, carrying the pin 131, which is straddled by the forked end of one arm of a bell crank lever 132 pivoted to the standard 67 as at 133. The other end of the lever 132 carries a roller 135 which rides in a cam groove provided in the face of the cam 136. This cam groove has a dwell portion 137 which holds the push rods in retracted position shown in Fig. 2; a portion 137a for advancing the push rods to effect insertion of the pins, as shown in Fig. 18, and a portion 137b for moving the push rods to retracted position.

The pilots L are operated as follows: Connected to a rock shaft 140, journalled on the bracket 67, is an arm 141, the lower end of which, as shown in Fig. 2, cooperates with the slide 118. On one end of this shaft 140 is a segment gear 142 meshing with a similar gear 143 on a lever 144 pivoted on a stud 145 (see Figs. 1 and 3). The lever 144 carries a roller 146 which rides in a cam groove provided in one face of the cam 147. This cam groove has a dwell portion 148 for holding the pilots in the retracted position shown in Figs. 2 and 20; a portion 148a for advancing the pilots and thereby align the holes in the links, as shown in Fig. 21; a dwell portion 148b for holding the pilots in advanced position until the pins being advanced by the push rods engage the ends of the pilots; and a portion 148c which is relatively wider than the remaining portions of the groove and in which the roller 146 is positioned while the pilots are being moved back to retracted position by the push rods acting through the pins as shown in Fig. 18. When the roller 146 reaches the position indicated by the reference 148d the pilots are positively moved slightly so as to insure that the same are withdrawn out of the path of movement of the chain advancing pushers 38.

As previously stated, the pins are fed by gravity through the chute H to the grooves 107 in the guide 108. For the purpose of holding pins in these grooves and against the pressure of the pins within the chute, when the shuttle is moving to and from delivery position, the following arrangement may be provided, reference being particularly had to Figs. 1 and 7. Mounted in the guide 108 and between the grooves 107 is the plunger or clamp 155 having a head adapted when the clamp is lowered to rest upon the pins within the grooves. The clamp 155 extends downwardly through the slide and has on its lower end, a spring normally urging the clamp into clamping position. 157 is a stud having an arm 158 engaging the lower end of the clamp 155. On the other end of the stud 157 is an arm 159 which is adapted to be engaged by an adjustable screw 160 carried by the shuttle I. It will be understood that when the parts are in the position shown in Fig. 7, that is, with the shuttle in receiving position, the clamp 155 is raised so that the pins will feed from the chute H into the grooves 107. When the shuttle starts to move from its receiving position, the screw 160 is withdrawn from the arm 159, whereupon the spring 156 urges the clamp downwardly into clamping position and the clamp will be held in this position until the shuttle returns to its receiving position. The numeral 162 designates a stop against which the shuttle I abuts when the spring 127 moves it to delivery position.

The connecting members may be the final hardened pins of the chain or may be in the nature of dummy pins. In the latter instance, after the links are assembled into a chain by use of the present machine, the dummy links may be withdrawn and the final pins inserted without disturbing the established relation of the links. It may be found desirable to use in combination with the present machine means for heading over the connecting members or at least so operating upon the ends of the connecting members after they are inserted that they will not be accidentally displaced during subsequent operations if any, upon the chain. To this end, there is shown, by way of illustration, means for clinching or nicking the ends of the pins after they are inserted. This means is actuated in timed relation to the other mechanisms and may be of any suitable construction. It is herein shown as including a pair of opposed clinchers or jaws 165 mounted for reciprocating movement in the side walls of the channel, as shown most clearly in Figs. 1 and 3. In the present instance, these jaws have sharp edges adapted to nick the ends of the pins, thereby forming thereon thin, small projections. The jaws are normally urged away from each other by a spring pressed plunger 166. The jaws are moved towards each other by levers 167 pivoted as at 168 and connected by toggle links 169 and a link 169' pivoted to one end of a lever 170, the other end of this lever having a roller 171 working in a cam groove in the face of a cam 172. This cam groove has a dwell portion 173 for holding the jaws in withdrawn position; a portion 173a for moving the jaws towards each other and thereby nick the opposite ends of the pins, and a return portion 173b, during which the spring pressed plungers 166 may move the jaws apart.

By preference the guide plates Y are supplied to both of the chutes D and E from a single hopper, a portion of which is disclosed in Fig. 13. This hopper may be generally similar to that disclosed in the patent to F. Muller No. 1,365,940 granted Jan. 18, 1921. In the present instance, however, the guide plates or links are delivered into the channel leading from the hopper irrespective of the direction in which the points or sharp corners of the links, lying within the rim of the rotary cone, project and the links are delivered from this channel to two branches so that all of the links delivered to one branch have their points projecting in one direction and those in the other branch project in the opposite direction.

Referring particularly to Figs. 13 to 17, inclusive, 195 designates a hopper and 196 a rotary cone having a rim or flange 197. The cone 196 may be similar to that described in said Muller patent and may be driven in like manner. The numeral 198 designates a channel leading tangentially from the hopper and at a level with the upper face of the rim 197. One side wall at the forward end of the channel forms an ejector 197' which guides the links which are lying lengthwise in the rim of 197 into the channel 198, irrespective of the direction in which the points of the links point. The channel 198 leads into two branch channels 200 and 201. The former may be considered as being a continuation of the channel 198. At the fork between the channels 200 and 201 is a deflector or turning plate 202 so constructed that the link elements with their points projecting towards one side of the channel 198 will ride over the plate 202 and into the channel 200, and the remaining elements having their points projecting towards the other side of the channel 198 will be deflected by the plate 202 into the channel 201. In the present instance, each guide plate has its back edge curved convexly and its over side edges concavely curved. The end corners Y' at the back are more pronouncedly curved than are the corners or points Y" at the other edge. The turning plate 202 has its forward edge 203 inclined transversely and in alinement with one wall of the channel 201 and the foremost corner of this plate is pointed at 204. The plate tapers down in thickness both transversely and longitudinally towards this point, that is to say, is wedge shaped. It will be seen particularly from Figs. 13 and 15 that when a guide plate with its points projecting to that side of the channel 198 from which the channel 201 extends, a rounded end corner of the back of the plate will engage against the vertical front face 203 of the turning plate and will thereby be deflected into the channel 201. As seen in Fig. 16, when a link element having its points facing in the other direction is fed up to the turning plate 202, the foremost point of the element will engage the point 204 and be raised thereby so that the element will clear the vertical face 203 and be forced by succeeding elements over the turning plate into the channel 200.

The channels 200 and 201 respectively terminate in the upper ends of the chutes D and E. A cover plate 209 may be provided for the channels. This cover plate, as is shown most clearly in Fig. 17, is provided with apertures 210 in registry with the chutes. These apertures are adapted to accommodate the passage of tamping members 211 which may be similar to, and operated in like manner as, the tamping members disclosed in said F. Muller patent.

The advantages of the arrangement just described are that the use of two separate hoppers, one for each side of the two chutes, is avoided; a single hopper is employed to supply to the respective chutes in steady streams and at the desired rapid rate link elements properly positioned with respect to one another. The arrangement is very simple, consists of relatively few parts, and requires practically no attention except that link plates be supplied to the hopper. The operation of the complete machine will now be briefly described, particular reference being had to Figs. 8, 9 and 10, showing the combing mechanism and Figs. 18 to 21, inclusive, diagrammatically illustrating the sequence of movements of various instrumentalities. In Fig. 18 the parts are shown in the position which they assume at the time pins are being inserted through the holes of the combined links. At this time the comber is in the position shown in Fig. 9, with the ram 66 in the dotted line position of that figure. It will be noted that the set of links A—1 is held in position between the teeth 69 of the movable combing blades 68 and a set of links A—2 is held in position between the central and foremost projection or teeth 72 of the fixed blades 71. The pressure of the ram on the comber has, however, been somewhat relieved because the ram has been moved upwardly by the cam 100 from the full to the dotted line position of Fig. 9, so that when the pilots K are advanced, the links are sufficiently free to permit these pilots to accurately aline the holes of the links to be connected. In Fig. 18 the push rods K are advancing to insert pins Z and these pins are pushing out the pilots L.

Assuming now that the pins have been inserted and the ram 66 raised fully, the push rods K are withdrawn to the retracted position shown in Fig. 19. When this ram is thus raised, the comber is elevated out of engagement with the links and when the arm 80 engages the abutment 81, the lever 78 is rocked in a direction to longitudinally move the movable combing blades from the position shown in Fig. 9 to that shown in Fig. 8. After the comber has been raised and the push rods K withdrawn, the cam 59 comes into play and advances the slide F a distance of two pitches with the result that the partially formed chain comprising the set of links A—1 and the set A—2, are advanced the distance of two pitches by the pushers 38 which act upon the pins inserted in the chain, and the rows of alined links are advanced the distance of the length of the links so that another row of link elements, all of which bear the reference character b, is moved to combing position. When the slide F is advanced, the driving link pusher 35 blankets or covers the discharge end of the chute C, and the guide plate pushers 36 blanket the discharge end of the respective chutes D and E. This position of the parts is shown in Fig. 19. At about this time, the shuttle I starts to move from the delivery position shown in Fig. 18 to the receiving position shown in Fig. 20. The slide F is now retracted and when it has been moved to the position shown in Fig. 20, and at which position the pusher 35 partially blanks the delivery end of the chute C, the guide M is advanced to the position shown in Figs. 4, 20 and 21. When the slide F has been moved to full withdrawn position shown in Fig. 18, the links in the delivery end of the chute C ride on the slide M into the channel A without danger of the links falling over or becoming otherwise displaced. In the present instance, two side plates will be delivered from each chute D and E into the channel A in advance of the pushers 36, as shown in Figs. 18 and 21.

When the shuttle I approaches its receiving position the screw 160 (see Fig. 7) engages the arm 159, whereupon the clamp 155 is raised so as to permit a pair of pins Z to be delivered to the grooves 109 of the shuttle I. When the shuttle then starts to move to delivery position, the screw 160 is withdrawn from the arm 159 whereupon the clamp 155 becomes effective to hold the pins which have been delivered to the grooves 107 in the guide 108.

After the partially formed chain has been advanced and, preferably, while the slide F is moving to retracted position, in order that there should be no unnecessary delay, the ram is lowered so as to bring the comber into operative relation to the row of links b which have been moved into combing position. When the ram is thus lowered, the combs first engage the links, as shown in Fig. 8. In this position the links of the set A—2 are positioned in the seats provided between the foremost and middle projections 72 of the fixed combing blades, the alternate links b—2 of the row to be combed are held in the seats provided by the middle projections and the rearmost projections 72 of the fixed blades, and the intervening links b—1 are positioned between the teeth 69 of the movable combing blades. When the combs are brought into engagement with the links, the comber is cushioned by the springs 93 with respect to the arm, so that injury to the parts is avoided, a smooth action may be had, and the links may be properly alined.

After the comber has been brought to the position shown in Fig. 8, the ram continues on its downward movement to the position shown in Fig. 9 and during such movement the pin 84 rotates the lever 78 in a direction to move the movable combing blades 68 from the position shown in Fig. 8 to that shown in Fig. 9, thereby moving the intervening links b—1 from the position shown in Fig. 20 to the position shown in Fig. 21. In Fig. 20 these links b—1, are shown as just starting on their movement. After the links b—1 have been thus combed, the ram is raised to the dotted line position shown in Fig. 9 so as to relieve the links of excessive pressure and thereupon the pilots L are advanced as shown in Fig. 21. When these pilots are thus advanced, they aline the holes at the opposite ends of the links b—1 with the holes in the respective links a—2 and b—2. The ends of the pilots are tapered, thereby permitting them to weave their way through the holes of certain of the links which may be slightly out of alinement. After the pilots have been moved to full forward position, the ram is elevated and the pins Z which have been moved to delivery position by the shuttle I are inserted by the push rods K. The pilots are forced back by the rod pushers K, acting through the pins so as to insure against possible displacement of the alined links as the ram is being raised. After each forward step of the chain, the jaws 165 are operated to nick the ends of the pin Z alined therewith. This sequence of movements is repeated until a chain of the desired length is obtained.

It will be seen from the foregoing description that the machine is entirely automatic in its nature; the several operations are carried out in a very simple yet effective manner, and the speed of operation is very high so that the rate of production is relatively great, all of which means that the parts of the chains are very quickly, effectively and properly assembled.

I claim as my invention:

1. In a chain assembling machine, the combination of means for forming successive rows of transversely alined link elements means for successively moving the rows by advancing the same the distance of the length of the link elements into combing position, means independent of said last mentioned means for moving certain of the link elements of the respective rows the distance of one pitch, and means for advancing the partially formed chain a distance of two pitches each time link elements are added thereto.

2. In a chain assembling machine, means for forming successive rows of transversely alined link elements, means for successively moving said rows to combing position by advancing the same with an intermittent movement corresponding to the length of the link elements, means independent of said last mentioned means for combing the rows at combing position to thereby advance certain of the link elements of the respective rows the distance of one pitch, means for inserting connectors into the opposite ends of the last mentioned link elements, and means for advancing the chain under construction the distance of two pitches each time link elements are added thereto.

3. In a chain assembling machine, means for forming successive rows of link elements in side by side relation, each row having two characters of link elements and the link elements of the several rows being correspondingly positioned, means independent of said last mentioned means for successively moving the rows to combing position, means for correspondingly combing the rows thus positioned to bring the link elements thereof in overlapping relation, and means for inserting connecting members in the combed links.

4. In a chain assembling machine a guideway in which the links are assembled, means for delivering links in side by side relation to said guideway, pusher means for intermittently advancing the link elements in a succession of rows in said guideway, means independent of said pusher means for successively combing said rows to thereby bring certain of the link elements thereof into overlapping relation to the link elements last connected to the chain, means for inserting connecting members in the overlapping link elements, and means adapted to engage the inserted connecting members for advancing the chain each time link elements are added thereto.

5. In a chain assembling machine, a guideway, means for delivering link elements thereto, pusher means for advancing the link elements in said guideway in a succession of rows to combing position, means for successively combing the rows at combing position to thereby bring the link elements of the respective rows into overlapping relation, and pusher means at each side of the guideway arranged to engage the connecting members inserted through the overlapping link elements to advance the partially formed chain each time link elements are added thereto.

6. In a chain assembling machine, a guideway, means for delivering transversely alined link elements to said guideway, pusher means for advancing the link elements in rows with an intermittent movement equal to the length of the elements, combing means arranged to advance corresponding link elements of successive rows a distance of one pitch, and pusher means for advancing the chain the distance of two pitches each time link elements are connected thereto.

7. In a chain assembling machine, a guideway, a chute for delivering link elements in side by side relation to said guideway, a chute for delivering to said guideway link elements of another character, means for advancing said link elements in said guideway in a succession of rows with the link elements of the different characters similarly positioned, and means for successively and correspondingly combing the rows of link elements.

8. In a chain assembling machine, a guideway, means for delivering transversely alined link elements of one character to said guideway, means in advance of said last mentioned means for delivering link elements of another character to said guideway, means for advancing the link elements delivered to said guideway in a succession of rows, each row being composed of similarly placed link elements of both characters, means for successively combing said rows, means for inserting connecting members in the combed link elements, and means for advancing the chain each time link elements are added thereto.

9. In a chain assembling machine, a guideway, means for delivering transversely alined links to a central portion of said guideway, means for delivering links of another character to each side of said guideway, means for advancing the link elements delivered to said guideway in a succession of rows and to a combing position, and means independent of said last mentioned means and operated in timed relation thereto for successively combing the rows delivered to combing position.

10. In a chain assembling machine, a guideway, a chute for delivering link elements of one character to a central portion of said guideway, a pair of chutes in advance of the first mentioned one and delivering to the opposite sides of said guideway link elements of another character, pusher means for advancing the link elements delivered by the first chute, and pusher means for correspondingly advancing the link elements delivered by the second mentioned chutes.

11. In a chain assembling machine, means for supplying successively groups of transversely alined link elements to combing position adjacent to the tail end of the chain under construction, a comb having members spaced apart in accordance with the spaces between the link elements last connected to the chain and means for moving said comb on a line at an angle to the direction in which the link elements are moved and into engagement with link elements supplied to combing position, then moving the comb to bring the links which it engages into overlapping relation to the link elements last connected to the chain, and then moving the comb to normal position.

12. In a chain assembling machine, means for successively supplying rows of transversely alined link elements to combing position, a comb comprising a plurality of blades transversely spaced apart and each having a pair of projections adapted to lengthwise straddle and engage the opposite ends of the link elements, and means for moving the comb to bring the link elements engaged thereby into overlapping relation to the link elements of the next preceding sets.

13. In a chain assembling machine, means for supplying successive rows of link elements to a combing position, combing means including members transversely spaced apart in accordance with the spaces between the link elements last connected to the chain, each of said members having a pair of projections adapted to longitudinally straddle the respective link elements, a plurality of members in intervening relation to said combing members and arranged to center and hold the link elements last connected to the chain, and mechanism for moving said members into and out of engagement with the respective link elements and causing said combing elements to move the link elements engaged thereby into overlapping relation to the link elements last connected to the chain.

14. In a chain assembling machine, means for supplying link elements in transversely alined relation to a combing position adjacent the tail end of a chain under construction, a comb adapted to move links thus supplied into intervening and overlapping relation to the next preceding set of link elements, and operating means for said comb to move into engagement with the link elements to be combed, then longitudinally to advance the link elements into overlapping relation to the next preceding set of link elements, and then away from the link elements, said operating means being arranged to resiliently press the comb into engagement with the link elements to be combed and partially relieve the pressure on such link elements after they have been moved to overlapping position.

15. In a chain assembling machine, means for supplying link elements in transversely alined relation to a combing position adjacent the tail end of a chain under construction, a comb adapted to move link elements thus supplied into intervening and overlapping relation to the next preceding set of link elements, means for holding the set of link elements last connected to the chain while the next succeeding set is brought into overlapping relation thereto, and means for moving said holding means and comb into engagement with the link elements of the respective sets, then longitudinally moving the comb to advance the elements engaged thereby into overlapping relation to the next preceding set of link elements, then raising the comb and holding means, said moving means being arranged to resiliently press the comb and holding means into engagement with the link elements of the respective sets and partially relieve the pressure on such link elements while connecting members are inserted in the overlapping ends of the link elements.

16. In a chain assembling machine, the combination of means for successively presenting rows of link elements arranged in side by side relation adjacent to the tail end of a chain under construction, a vertically and horizontally movable comb for bringing corresponding link elements of each row into overlapping relation to the remaining link elements of the respective row and to the link elements last connected to the chain, and a vertically movable comb for holding the link elements last connected to the chain and said remaining link elements against longitudinal movement during the combing operation and while alining members are inserted through the combed links.

17. In a chain assembling machine, means for successively supplying rows of link elements to a combing position, a movable comb having members transversely spaced apart in accordance with the spaces between the link elements last connected to the chain, a second comb having a plurality of members in intervening relation to the members of said first comb and arranged to center and hold the link elements last connected to the chain and those link elements of the respective rows which are not advanced during the combing operation, and mechanism for moving said combs into and out of engagement with the respective link elements and causing said first mentioned comb to move the link elements engaged thereby into overlapping relation to the link elements last connected to the chain.

18. In a chain assembling machine, means for supplying successive rows of link elements to combing position adjacent the tail end of the chain under construction, means for combing a row of link elements thus supplied into overlapping relation to the link elements last connected to the chain and to the remaining link elements of the respective row, means for holding the link elements last connected to the chain and said remaining link elements during the combing operation, means for moving said holding means into and out of engagement with said mentioned links, and pilots insertible in the overlapping ends of the link elements while said holding means is effective.

19. In a chain assembling machine, means for successively positioning rows of alined elements in a combing position, means for successively combing the rows of link elements, means for inserting connecting members in the combed link elements, means for advancing the chain each time link elements are added thereto, and means for temporarily nicking the ends of the connecting members.

20. In a chain assembling machine, the combination of means for successively positioning rows of transversely alined link elements adjacent the tail end of a chain under construction, means for moving corresponding link elements of the respective rows a distance of one pitch, means for inserting connecting members through the opposite ends of the link elements thus moved, means for advancing the chain a distance of two pitches each time link elements are added thereto, and means for temporarily nicking the ends of said connecting members.

21. In a chain assembling machine, means for successively presenting rows of link elements in side by side relation to a combing position, means for successively combing the rows of link elements to bring correspondingly placed link elements of the successive rows in overlapping relation to the remaining link elements of the respective rows and to the next preceding set of link elements, means for inserting connectors through the opposite ends of the combed link elements, and means for nicking the ends of said connectors including a pair of edged jaws, and means for moving the same towards and away from each other.

22. Chain link combing mechanism including a comb mounted for movement on a line normal to the direction in which the chain is advanced and into engagement with the link elements to be combed and mounted for movement in the direction in which the link elements are to be combed and having transversely spaced apart projections adapted to engage said link elements.

23. Chain link combing mechanism including a longitudinally movable comb having a plurality of transversely spaced apart blades provided with seats adapted to respectively receive the links to be combed, a second comb fixed against longitudinal movement and having blades in intervening relation to said first mentioned blades and each provided with a pair of seats adapted to respectively receive link elements of two sets.

24. Chain link combing mechanism including a carrier, a comb mounted for movement thereon, means for raising and lowering said carrier, and means for moving said comb in a direction to comb the link elements.

25. Chain link combing mechanism including a carrier, a comb mounted for longitudinal movement thereon, means for raising and lowering said carrier, and means actuated by movement of said carrier for moving said comb.

26. Chain link combing mechanism including a carrier, a head mounted thereon for limited movement relative thereto, a movable comb on said head, and means between said carrier and comb for moving said comb in said head when said comb has been brought into engagement with the link elements to be combed.

27. Chain link combing mechanism including a carrier, a head mounted for limited movement thereon, a comb mounted for movement on said head, and a lever carried by said head and cooperating with said comb, said head having means thereon adapted to engage said lever when the carrier is lowered to thereby move said comb in said head.

28. Chain link combing mechanism including a carrier, a head mounted for limited movement thereon, a comb movably mounted in said head, a lever pivoted in said head and cooperating with said comb, an adjustable member carried by said carrier adapted to engage said lever, an arm connected to said lever, and a fixed abutment adapted to engage said arm when said carrier is raised.

29. Chain link combing mechanism including a comb having spaced apart combing members, a second comb having combing members in intervening relation to the first ones, and mechanism for moving said combs into and out of engagement with the respective link elements and causing said first comb to move the link elements engaged thereby into overlapping relation to other elements.

30. Chain link combing mechanism including a carrier, a head mounted for limited movement relative thereto, a comb on said head, resilient means between said carrier and head for urging said comb resiliently against the link elements, and means for moving said carrier to bring the comb into and out of engagement with the link elements and at a predetermined time to partly relieve the pressure on said head.

31. Chain link combing mechanism including a carrier, a head mounted thereon for limited movement, a comb mounted for movement in said head, means actuated by the movement of said carrier for moving said comb in said head, springs between said carrier and head, and means for raising and lowering said carrier and arranged to slightly raise said carrier to partially relieve the pressure of the comb on the link elements after the link elements have been combed.

32. Chain link combing mechanism including a carrier, a head mounted thereon for limited movement, a comb mounted in said head for longitudinal movement, a second comb carried by said head against longitudinal movement, resilient means between said head and carrier, means for raising and lowering said carrier, and means controlled by the movement of said carrier and mounted in said head for moving said movable comb.

33. In combination, a push rod mounted for longitudinal reciprocating movement, a chute at one side of said rod and down which connectors are adapted to be fed end to end, a shuttle movable back and forth into operative relation to said chute and rod, means for moving said shuttle, and means for moving said rod in timed relation to said shuttle.

34. In combination, a pair of push rods positioned side by side and mounted for longitudinal reciprocating movement, a pin chute down which two lines of pins are adapted to be fed by gravity, a shuttle having a pair of grooves adapted to respectively receive pins from said chute and then carry the same into alinement with the respective rods, means for longitudinally reciprocating said rods, and means for transversely reciprocating said shuttle in timed relation to said last mentioned means.

35. In combination, a push rod mounted for longitudinal reciprocating movement, a pin chute down which pins are adapted to be fed in end to end relation, a shuttle reciprocating back and forth in operative relation to said pin chute and push rods, a clamp at the discharge end of said chute for holding a pin against movement while said shuttle is moving, means carried by said shuttle for controlling said clamp, means for reciprocating said shuttle, and means for reciprocating said rods.

36. In combination, a guideway, a chute adapted to deliver link elements in side by side relation and in upright position to said guideway, a pusher for advancing said link elements in said guideway, said pusher, when advanced, being arranged to blank the delivery end of said chute, and a member adapted to be moved into said guideway and then withdrawn whereby said link elements are guided from the chute into the guideway when said pusher is moved to retracted position.

37. In a chain assembling machine, a guideway, a chute for delivering link elements through the side of said guideway and to a central portion thereof, a pair of chutes in advance of the first mentioned one for delivering link elements to the opposite sides of said guideway, a pair of diaphragms one in front of the delivery end of each of the second mentioned chutes, said diaphragms being spaced apart a distance corresponding to that of the guideway to which the first mentioned chute delivers, pusher means for advancing the link elements delivered by the first mentioned chute, and pusher means for correspondingly advancing the link elements delivered by the second mentioned chutes.

38. In a chain assembling machine, a guideway, means for supplying transversely alined link elements to said guideway, means for advancing said link elements in rows in said guideway to a combing position, and combing means independent of said last mentioned means for moving the link elements delivered to the combing position into intervening and overlapping relation to the link elements last connected to the chain, said combing means comprising a plurality of transversely spaced apart members movable in the direction of the length of the chain.

39. In combination, a guideway, a chute adapted to deliver elements in side by side relation and in upright position to said guideway, a pusher for advancing said link elements in said guideway and arranged, when advanced, to blank the delivery end of said chute, a horizontally disposed member in the delivery end of said chute and adapted to be straddled by the link elements as they are delivered from said chute to said guideway to maintain said link elements in upright position, and means for moving said member into said guideway and then withdrawing said member.

40. In a chain assembling machine, the combination of means for successively presenting rows of link elements in side by side relation to a combing position, means for successively combing the rows of link elements to bring correspondingly placed link elements of the successive rows into overlapping relation to the remaining links of the respective rows and to the last preceding set of link elements, means vertically movable into and out of engagement with, and adapted to engage the opposite ends of each of said remaining link elements for positively holding the same during the combing operation, and means for moving said holding means.

RICHARD F. DOW.